(12) United States Patent
Falk et al.

(10) Patent No.: US 8,352,454 B2
(45) Date of Patent: Jan. 8, 2013

(54) SYSTEM AND METHOD FOR PERFORMING DATA SEARCHES USING MULTIPLE DATA SEARCH PROVIDERS

(75) Inventors: David Alan Falk, Evanston, IL (US); Kevin Richard Bess, Wheaton, IL (US); Gregory Douglas Fast, Des Plaines, IL (US)

(73) Assignee: Travelport Development LLC, Chicago, IL (US)

( * ) Notice: Subject to any disclaimer, the term of this patent is extended or adjusted under 35 U.S.C. 154(b) by 394 days.

(21) Appl. No.: 11/734,077

(22) Filed: Apr. 11, 2007

(65) Prior Publication Data

US 2008/0256036 A1 Oct. 16, 2008

(51) Int. Cl.
*G06F 7/24* (2006.01)
*G06F 17/30* (2006.01)
(52) U.S. Cl. ......... 707/708; 707/600; 707/770; 707/771
(58) Field of Classification Search ................. 707/3, 4, 707/100, 999.003, 999.004, 999.1, 706, 708, 707/716, 999.107, 999.01, 600, 770, 771; 705/5, 6, 14.23
See application file for complete search history.

(56) References Cited

U.S. PATENT DOCUMENTS

| | | | |
|---|---|---|---|
| 6,269,365 B1 * | 7/2001 | Kiyoki et al. ................. | 707/602 |
| 2001/0054020 A1 * | 12/2001 | Barth et al. ..................... | 705/37 |
| 2003/0126120 A1 * | 7/2003 | Faybishenko et al. ........... | 707/3 |
| 2004/0249680 A1 * | 12/2004 | Liew et al. ......................... | 705/5 |
| 2007/0192147 A1 * | 8/2007 | Liew et al. ........................ | 705/5 |
| 2007/0192300 A1 * | 8/2007 | Reuther et al. .................... | 707/3 |
| 2007/0233529 A1 * | 10/2007 | Isnardon et al. .................. | 705/6 |
| 2008/0167908 A1 * | 7/2008 | Marcken ........................... | 705/5 |

* cited by examiner

*Primary Examiner* — Bruce Moser
(74) *Attorney, Agent, or Firm* — Edwards Wildman Palmer LLP

(57) ABSTRACT

A system and method are provided for performing data searches in response to a user request. The system has an application server that is configured to receive user requests, to send search requests based on the user requests, and to communicate with a plurality of search provider systems. The search provider systems each have searchable data and are configured to receive the search requests from the application server and generate search results in response to the search request. A rules manager resides on the application server and is configured to identify a set of search provider systems to send the search request to based on the user request. The method includes the steps of: receiving a user request; determining a set of search providers based on the user request; sending a search request to the set of search providers; receiving search results from at least one of the search providers; merging the search results received from the set of search providers; and sending the merged search results to the user.

11 Claims, 4 Drawing Sheets

SYSTEM AND METHOD FOR PERFORMING DATA SEARCHES USING MULTIPLE DATA SEARCH PROVIDERS

FIELD OF THE INVENTION

The present invention relates to systems and methods for performing data searches, particularly for performing data searches using multiple data search providers.

BACKGROUND OF THE INVENTION

Currently, typical search engines, for example those in the on-line travel industry, only use one search provider. For example, an on-line travel website may obtain airline flight information from a third party and maintain their own database of flight information to perform searches against. In addition, rather than maintaining their own database, an on-line travel website may use the search services provided by a computerized reservations system (CRS) or a global distribution system (GDS). However, there are various problems inherent in the use of only a single search provider, whether it is an internally maintained database, a CRS, or a GDS.

For example, there may be data that is not publicly available through a single search provider. In the travel industry for example, access to information regarding low cost carriers (LCCs) is only available through the CRS that hosts the LCC and would not be accessible if the on-line travel site were to maintain their own database or use another CRS or GDS. Therefore, the search results obtained by a travel website that maintained their own database or used a particular CRS or GDS would not necessarily be complete.

In addition, dramatic increases in search activity may decrease the performance of an individual search provider. For example, if a travel site were to use a particular CRS or GDS to perform searches and the CRS or GDS has a increase in search activity at any given time, the search requests from the travel site may be delayed or denied.

Finally, the information available in an internal database or through a particular CRS or GDS may not always be the most up to date information available. For example, if an airport were to close down at some point during the day due to weather or other circumstances, the travel website that maintained their own database would probably continue to provide search results for that airport, even though flights to and from those airports are no longer available.

Therefore, it would be beneficial to have a system and method for performing data searches, especially in the on-line travel industry, that could support the use of multiple search providers to provide more consistent, complete, and accurate search results.

SUMMARY

In one example, a system is provided for performing data searches in response to a user request and comprises an application server that is configured to receive user requests, to send search requests based on the user requests, and to communicate with a plurality of search provider systems. The search provider systems each comprise searchable data and are configured to receive the search requests from the application server and generate search results in response to the search request. A rules manager resides on the application server and is configured to identify a set of search provider systems to send the search request to based on the user request.

In another example, a method is provided for performing data searches in response to a user request comprising the steps of: receiving a user request; determining a set of search providers based on the user request; sending a search request to the set of search providers; receiving search results from at least one of the search providers; merging the search results received from the set of search providers; and sending the merged search results to the user.

DETAILED DESCRIPTION

A system and method are provided for performing data searches in response to a user request using multiple search providers. In particular, the exemplary system described herein describes a system and method as would be used by a travel related website to perform travel related searches, particularly airline flight searches. However, it will be understood that the description herein is only one example and the system and method could be adapted for any desired application and type of data search desired.

Figure 1:
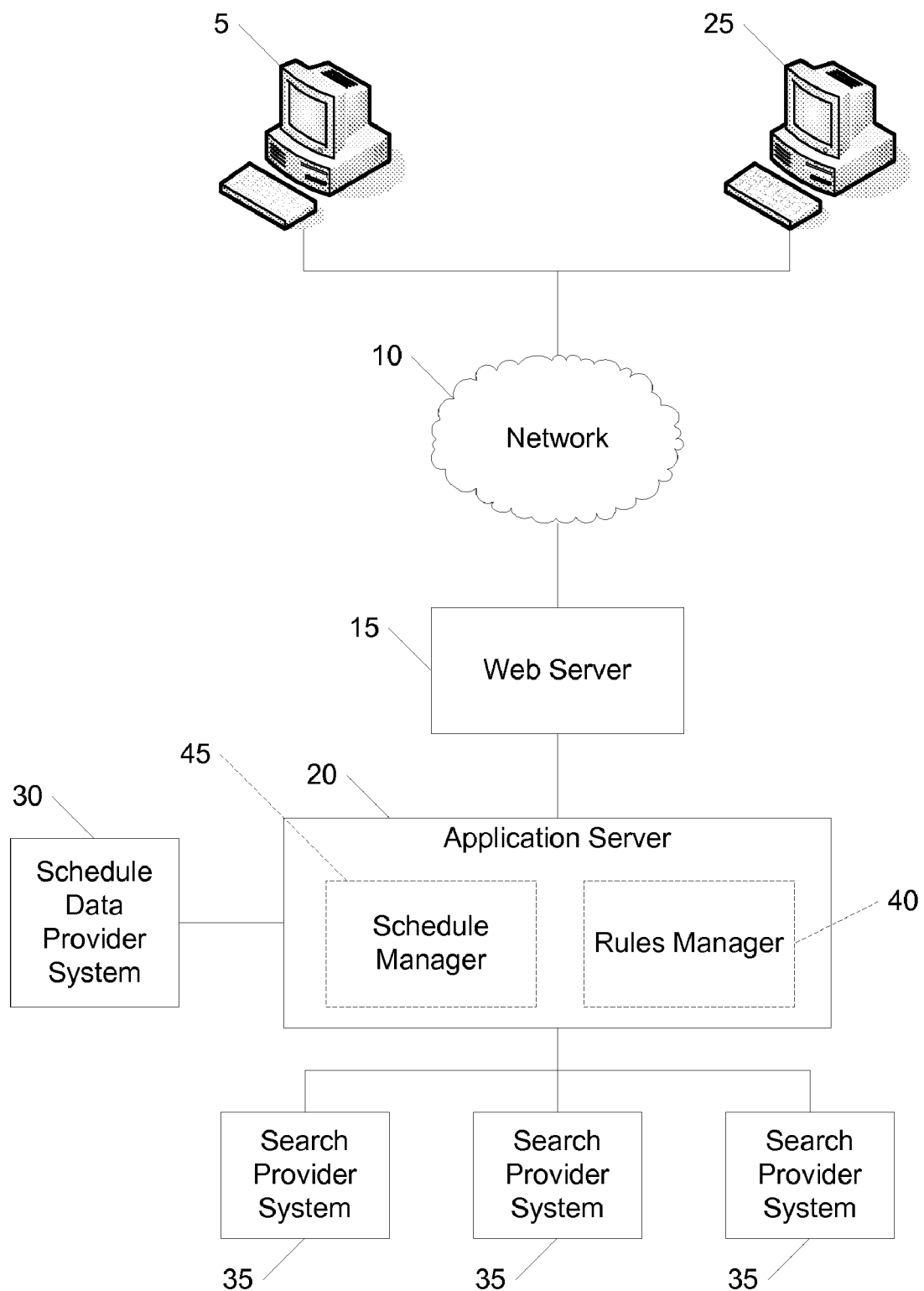
FIG. 1 is a block diagram of an exemplary system for performing data searches in response to a user request.

Referring to FIG. 1, an exemplary system for performing data searches using multiple search providers is shown. In this example, web server 15 contains a travel related website where users can search for travel related services, such as airline flights. User computer 5 is connected to web server 15 through network 10 and is used by the user to access the travel related website. User computer 5 could be any type of computing device that is able to connect to and access a server through a network such as a desktop computer, laptop computer, work station, personal digital assistant (PDA), smart phone, pocket PC, cell phone, etc. In addition, network 10 could be any type of network that is able to interconnect computing devices, such as a local area network (LAN), wide area network (LAN), the Internet, etc. Web server 15 communicates with user computer 5 to provide web content, such as web pages, to user computer 5 and to receive information, such as user requests, from user computer 5.

In addition to user computer 5, agent computer 25 can also be connected to web server 5 through network 10. Agent computer 25 is typically used by a customer service representative of the travel website to access web server 10 and assist users of the travel website. Alternatively, agent computer 25 could be connected directly to application server 20 or directly to one or more search provider systems 35. For example, if a user were having difficulties finding a particular flight, the user could call a customer service representative who would access the travel website and assist the user in finding a flight. Similar to user computer 5, agent computer 25 could be any type of computing device that is able to connect to and access a server through a network such as a desktop computer, laptop computer, work station, PDA, smart phone, pocket PC, cell phone, etc. In addition, agent computer 25 could access web server 15 through the same type of network as user computer 5 or it could use another type of network. For example, user computer 5 may be connected to web server 15 through the Internet while agent computer 25 may be connected to web server 15 through a LAN.

Application server 20 communicates with web server 15 and receives user requests from web server 15, performs searches based on the information contained in the user request, and returns final search results to web server 15, which then sends the final search results 15 to user computer 5 for display to the user. Although application server 20 and web server 15 are shown herein as separate servers, it will be understood that application server 20 and web server 15 could be physically separate servers or could be physically located on the same server. In addition, depending on the size of the system, there could be multiple application servers 20 and/or multiple web servers 15.

Multiple search provider systems 35 also communicate with application server 20. In this example, search provider systems 35 could be any type of system that provides searchable data regarding airline flights, such as CRSs and GDSs. The travel related website could also obtain or download airline flight data and maintain its own database of information, in which case one of the search provider systems 35 would be the website's own database. This database could be located on a separate server that is connected to and communicates with application server 20 or could reside on application server 20. In addition, application server 20 could be in communication with an airline system and therefore one of the search provider systems 35 would be the airline system.

In this example, for flight searches received by travel related websites, the search provider systems 35 should be able to support: searches for US and international origins and destinations; searches using various passenger types (e.g. adult, senior, youth, child, infant in seat, infant on lap, etc.); searches for up to 9 passengers; searches that exclude particular airlines or limit the search to specific airlines; and searches specifying non-stop and/or connecting flights. Of course, these requirements would be different depending on the types of searches performed, the type of data searched, and the particular application. For a travel related website receiving user requests for airline flights some typical service providers that have available search provider systems are: ITA Software, Inc. ("ITA") (provides flight information for numerous airlines); Worldspan, L.P. ("Worldspan") (a GDS that provides flight information for numerous airlines); ebookers Limited ("AFO") (a search host that provides flight information for various European airlines, it also provides flight information from multiple other sources such as Galileo, Hitchhiker DB, and Squirrel); AiRes (provides flight information for LCC Virgin America); Navitaire (provides flight information for LCC Jet Blue); Galileo International, L.L.C. ("Galileo") (a GDS that provides flight information for various European airlines and also operates a GDS by the name of Apollo); and Amadeus IT Group S.A. ("Amadeus") (a GDS that provides flight information for various European airlines). As discussed in more detail below, application server 20 will send search requests to one or more search provider systems 35 based on the user request received and the search provider systems 35 will receive and process the search requests and return search results to application server 20.

Application server 20 also contains rules manager 40. As discussed in more detail below, rules manager 40 is used to determine which search provider systems 35 will be sent a search request based on the user request and is also used to determine how the search results received from the various search provider systems 35 should be merged. In this example, rules manager 40 is a program that resides on application server 20 and the rules used by rules manager 40 are configurable and stored in an XML rules file.

In operation, rules manager 40 reads in the rules file to dynamically determine which search providers are appropriate for a given user request. The rules manager 40 receives a package from the rules file and looks for classes with a specific id that end in "Condition" and "Action" using java reflection to load the conditions and actions. It is also possible to specify the class to be sued in the rules so that the id does not have to conform to any particular naming schema. The conditions are either true or false. If the conditions are all true, then all of the actions associated with a specific rule are applied to a state object.

For example, each condition would implement a method that would return a boolean stating whether the request has successfully passed the condition. All of the conditions specified in the rules file must pass for the actions associated with that particular rule to be applied.

Based on the actions, rules manager 40 will either add or remove search providers from a rules state object, which is later used to determine which search provider systems to send search requests for a specific user request and how to merge the search results received from the search provider systems. Search providers can be added or removed at various levels such as the particular airline, the number of stops, etc. For example, the rules file can specify that a specific airline, such as Delta, be searched against a particular search provider system, such as WorldSpan, but to only search for non-stop flights. In addition, search providers can be included with specifications as to their priority, as described in more detail below, and whether or not they have a failover provider. If a search provider has a failover provider, the failover provider would follow the same logic.

In this example, the actions specify a particular search provider and the search request to be sent to each search provider. For example, if a request passes all conditions, the "add" action may state to send a search request to search provider A for carriers A, B, and C only. Another rule might state that a search request should be sent to search provider B for carriers D and E. The state object stores the current set of search providers that should be searched once all the rules are completely traversed along with the details of how to search each search provider.

Application server 20 also contains schedule manager 45, which receives airline schedule information from schedule data provider system 30. In this example, schedule data provider system 30 is the system available through OAG and provides airline flight schedule information, such as the destinations serviced by various airlines. As described in more detail below, schedule manager 45 is used to determine which airlines service the destinations identified in the user request in an attempt to narrow the list of possible service providers that to those known to contain information relevant to the user request. Alternatively, depending on the particular application, the type of data being searched, etc., there may not be a schedule data provider system 30 or schedule manager 45. In addition, schedule manager 45 could be an integral part of rules manager 40.

Figure 2:
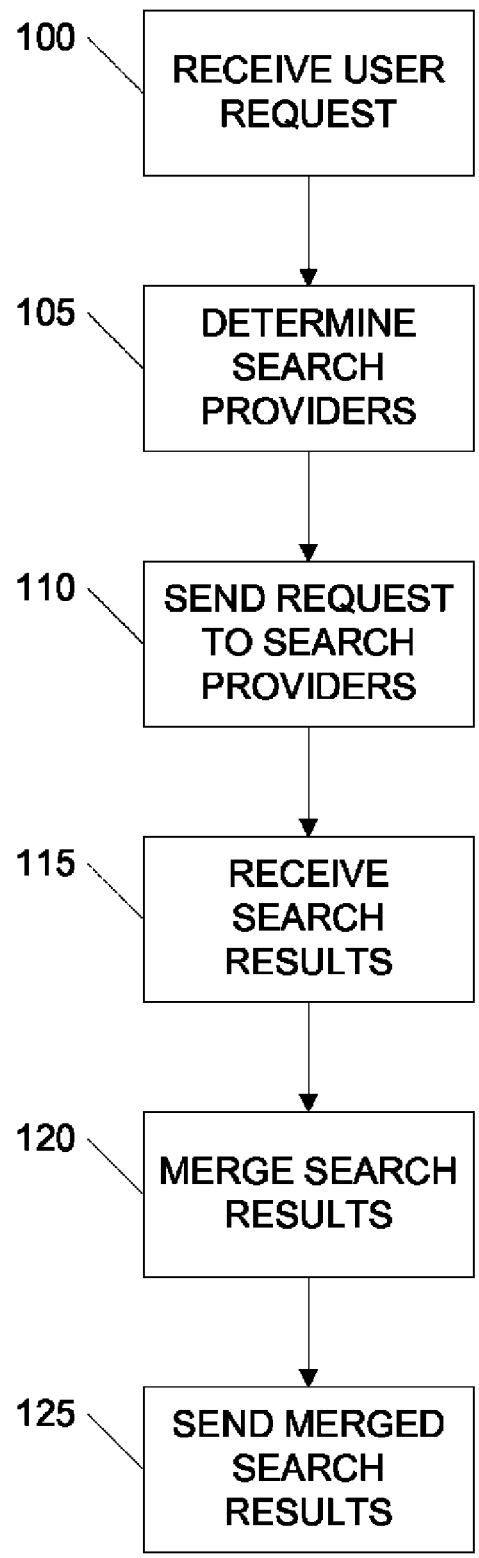
FIG. 2 is a flow diagram of an exemplary method for performing data searches using the system of FIG. 1.

Referring to FIG. 2, an exemplary method for performing searches, particularly for airline flights, using the system described above is shown. Initially, a user accesses the travel related website using user computer 5 to access web server 15 through network 10. The user then navigates through the website and performs a search for airline flights. Alternatively, a user could call a customer service representative who would then use agent computer 25 to access web server 15 and perform a search using the information provided to the agent by the user.

Depending on the travel website, there could be various methods of airline flight searching that a user can use. For example, a user could do a basic low fare search, which would search for the lowest fare flights based on the origin, destination, dates of travel, number of passengers, or other basic travel information. The user could also do a tip search, which would expand the scope of a low fare search by presenting the user with alternative flights for better fares by using fewer restrictions, for example, alternative travel dates, alternative airports, alternative airlines, etc. The user could also do a flex search, which would perform the search looking for lower fares with minor variations to the user request such as 1 day before or after the requested travel dates, moving travel dates to over weekends, using variable return dates, etc.

To perform the search, web server 15 provides a web page to the user requesting information regarding the flights to search for. For example, the web page may request that the user provide an origin, a destination, a departure date, a return date, and the number of passengers traveling. The user then enters the requested information and submits the request to web server 15, which in turn sends the user request to application server 20. At step 100, application server 20 receives the user search request.

Once application server 20 receives the user request, at step 105 application server 20 uses the information provided in the user request to determine which search providers should be sent search requests. In this example, application server 20 first uses schedule manager 45 to determine which airlines provide flights between the origin and destination provided by the user, as described in more detail below. As discussed above, depending on the system, application, and type of data being searched, schedule manager 45 may not be required and this portion of this step would not be performed. Based on the information from schedule manager 45, some search providers may be excluded because they do not serve the locations identified in the user request or search requests sent to search provider systems 35 could be limited. Application server 20 then uses rules manager 40 to determine which search provider systems 35 should be sent search requests based on the information in the user request, as described in more detail below.

Once application server 20 has determined which search providers will be sent search requests, at step 110 the search requests are sent to the search provider systems 35 of the selected search providers. The search requests are sent in the particular format requested by the search provider. In this example, each search provider system 35 is sent a search request that is specific to that search provider. For example, one search provider system 35 may be sent a search request to search only for flights for a specific airline while a second search provider system 35 may be sent a request to search for flights on all airlines. Each search provider is dynamically loaded through SPRING to load the provider specific search implementation based on a coordinated bean ID which uses the search provider's code and the search type as the identifier.

The selected search provider systems 35 will receive the search requests from application server 20, search for flights that meet the parameters of the search request, and return the search results to application server 20. At step 115, application server 20 receives the search results from the various search provider systems 35. In this example, for each search provider system 35, application server 20 starts a thread, which updates a main thread with the results received from each search provider system 35, whether it is a successful search or a failed search. The main thread will wait until it is notified that a particular search provider system has completed the search or until a dynamically determined timeout period has elapsed. The main thread collects the search results from each search provider system 35 as they are returned to decrease the total search time by performing what processing it can while waiting for search results from other search providers. This is done by placing the search results into a hashmap as they are received, where the key is the itinerary itself. This is done since it is the itinerary and whether there are other results for that same itinerary that will determine which pricing solutions are used and sent to the user.

Once application server 20 has received search results from the selected search provider systems 35, or the predetermined timeout period has elapsed, rules manager 40 merges the search results received from the search provider systems 35, as described in more detail below. Rules manager 40 contains a predetermined set of merge rules, which will control how to combine the search results into one overall final search result to send to the user.

After the search results are merged, at step 125 the final search results are sent from application server 20, to web server 15, and on to user computer 5, which will display the final search results to the user.

Figure 3:
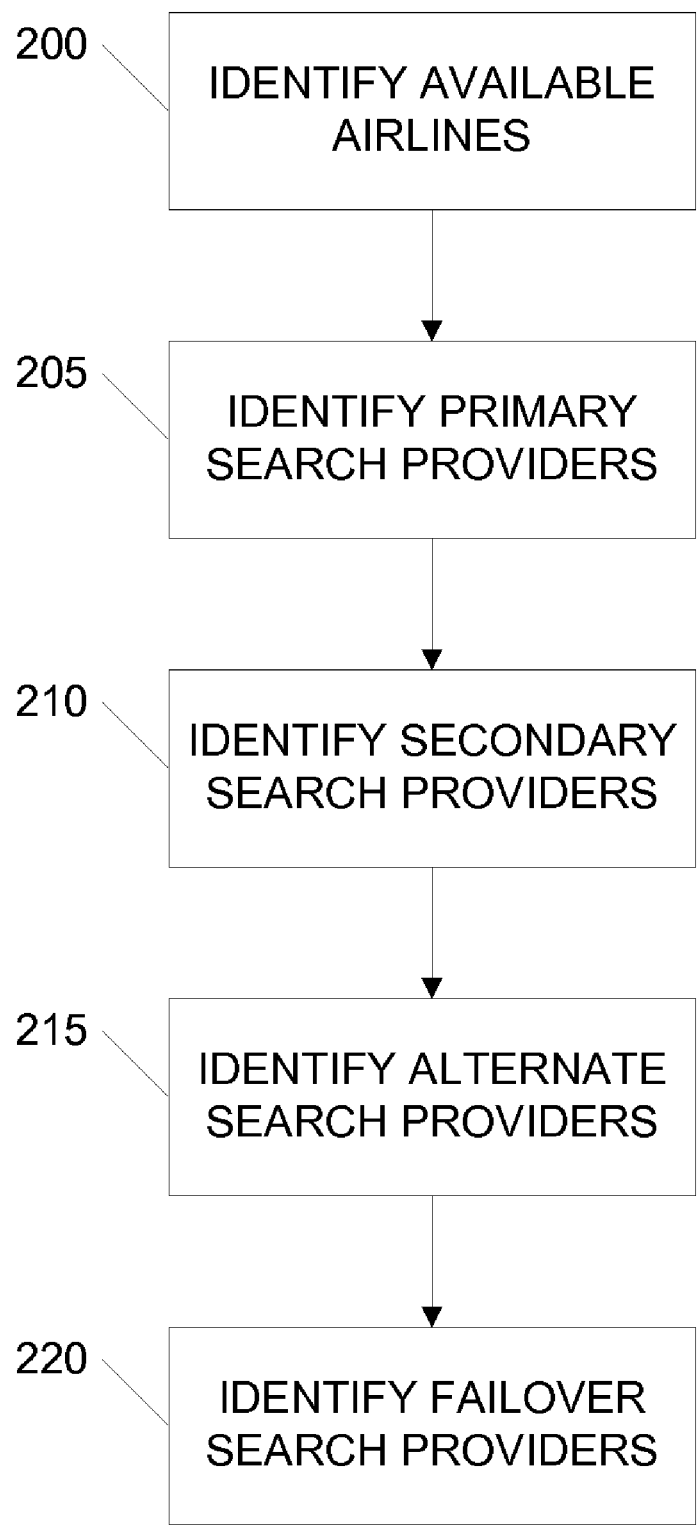
FIG. 3 is a flow diagram of an exemplary method for determining a set of search providers.

Referring now to FIG. 3, exemplary steps for determining which search providers to send a search request to based on the user request are shown. At step 200, schedule manager 45 identifies the airlines that service the origin and destination locations indicated in the user request. In this example, this is done to attempt to limit the number of search providers to send search requests to, which may limit problems that may occur from overloading a search provider system 35. Schedule manager 45 obtains information about which airlines service which markets from schedule data provider system 30, which can be OAG or any other appropriate provider of airline flight data, and provides a list of airlines that service particular markets. Alternatively, schedule manager 45 can also obtain information from multiple schedule data providers if no single schedule data provider system contains all information for all airlines. If schedule manager 45 can specifically exclude an airline that does not service a particular market, then that airline is removed from the search request. By removing particular airlines that do not service the market, some search providers may be excluded (e.g. if they are for a specific excluded airline) and the search requests sent to other search provider systems 35 may be limited. However, when schedule manager 45 cannot specifically exclude a particular airline, for example if it does not have information as to whether or not a particular airline services a specific market, then that airline should be included in the search request. As mentioned above, is some instances schedule manager 45 may not be required or desirable and therefore be excluded from the system and this step in the process would not be performed.

Once specific airlines, if any, have been excluded, at steps 205-220 rules manager 40 uses the rules to identify specific search provider systems 35 that will be sent search requests based on the user request and the excluded airlines. In the example described herein, the search providers are categorized into various provider types such as primary, secondary, alternate, and failover. However, depending on the subject matter the search engine is being used for, the number and type of search providers, the particular application, and other factors, the search providers could be categorized differently or not categorized at all. A given search request will only be sent to a search provider if the search provider is capable of performing that search and has the capacity to do so. Various attributes can be used to determine which search provider systems 35 are sent a particular search request, such as: where the user request came from (e.g. the Internet, a corporate client, a particular website, etc.); the market the user request came from (e.g. the United States, Europe, Asia, etc.); the point of sale; the type of search (e.g. individual ticket, bulk sale, travel package, etc.); particular requested or excluded carriers; the origin (this could be expressed as an airport code, city code, region code, etc.); the destination (this could be expressed as an airport code, city code, region code, etc.); the departure date; the return date; etc. Which attributes are used will be determined by various factors such as the particular application, the type of information being searched, and the number and type of search providers.

Specifically, at step 205, rules manager 40 identifies a primary search provider, if any. A primary search provider is a search provider that contains flight information for a large number of airlines and typically provides the majority of the information is response to a search request. In this example, an effort is made to identify at least one primary search provider for each user request received, however, there may be instances where identifying a primary search provider is not possible. For example, if a user requests only flights for a particular LCC (whose information is only available through a secondary search provider) then no primary search provider will be identified. As discussed in more detail below, in some situations if at least one primary search provider is identified and no primary search providers return search results in response to a search request the entire search is considered a failure. For example, the websites own internal database may designated as a primary search provider.

At step 210, rules manager 40 identifies secondary search providers, if any. A search provider is typically categorized as a secondary search provider if it contains flight information that would not otherwise be available from other search providers. For example, secondary search providers may contain exclusive content that is not available through other search providers (e.g. flight information for LCCs).

At step 215, rules manager 40 identifies alternate search providers, if any. A search provider can be designated as an alternate search provider for a variety of reasons. For example, a specific search provider may contain more accurate and timely information for a specific airline. If a travel website has a direct connection to a specific airline, such as United Airlines, it may designate the United Airlines direct connection as an alternate search provider since the information from the United Airlines direct connection could be more accurate and timely. The search results received from the United Airlines direct connection can then be used to supplement or replace portions of the search results from a primary, secondary, and/or failover search provider. For example, Worldspan may be designated as an alternate search provider.

At step 220, rules manager 40 identifies failover search providers, if any. As described in more detail below, a failover search provider is used to provide search results when a corresponding primary search provider is not available or does not return any search results in response to a search request. Not all primary search providers will necessarily have a corresponding failover search provider. If a search request is sent to a failover search provider, the search results returned from the failover search provider are treated the same as if they were received from a primary search provider.

Figure 4:
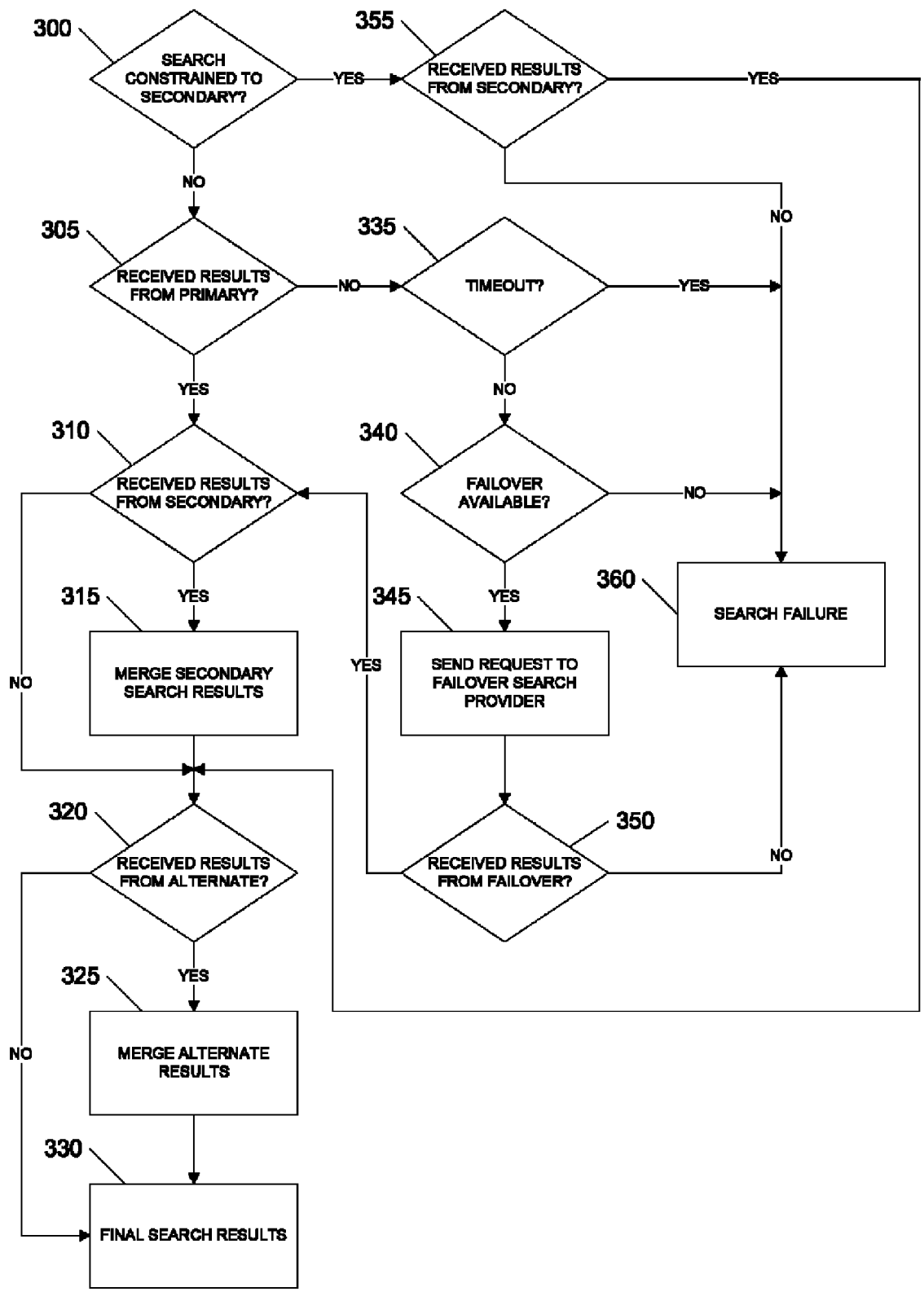
FIG. 4 is a flow diagram of an exemplary method for merging the search results received from a plurality of search providers.

Referring to FIG. 4, exemplary steps taken to merge search results received from multiple service provider systems 35 is shown. At step 300, rules manager 40 determines if the search requests sent to the service provider systems 35 were constrained to secondary search providers. As stated above, for most user requests, rules manager 40 will attempt to identify at least one primary search provider, however, there may be instances where a primary search provider cannot be identified. Alternatively, the implementation could require the selection of at least one primary search provider, in which case this step is not needed. If the search requests were constrained to secondary search providers, the process continues with step 355. If the search requests were not constrained to secondary search providers, the process continues with step 305.

At step 305, rules manager 40 determines if any search results were received from the primary search provider(s) that search requests were sent to. If no search results were received from any primary search providers, for example if an error or failure message is received or no search results are available that meet the search constraints, the process continues with step 335. If search results were received from a primary search provider, the search results from the primary search provider are included in the overall search results and the process continues with step 310. In addition, if search results were received from multiple primary search providers, the search results from the multiple primary search providers would be merged at this point.

At step 310, rules manager 40 determines if any search results were received from any secondary search provider(s) that search requests were sent to. If no search results were received from any secondary search providers, for example if no secondary search providers were sent search requests, an error or failure message is received, or no search results are available within the search constraints, the process continues with step 320. If search results were received from a secondary search provider, the process continues with step 315.

At step 315, the search results received from the secondary search provider are merged into the overall search results. As mentioned above, flight information from secondary search providers typically contains information that is not available from primary search providers and, therefore, the search results from the secondary search provider would be added to the search results from the primary search provider. Since at this point search results have been received from a primary or failover search provider, final search results will be sent to the user regardless of whether or not any secondary search provider returns any search results.

At step 320, rules manager 40 determines if any search results were received from any alternate search providers. If no search results were received from any alternate search providers, for example if no alternate search providers were sent search request, an error or failure message is received, or no search results are available with the search constraints, the process continues with step 330. If search results were received from an alternate search provider, the process continues with step 325.

At step 325 the search results received from the alternate search provider are merged into the overall search results. As described above, rules manager 40 would determine whether duplicate search results from the alternate search provider should overwrite search results from the other search providers or should be discarded. The use of duplicate search results from a primary or alternate search provider will depend on the various factors and will be different for different applications and between specific search providers. For example, it may be determined that flight information received from alternate search providers is always more accurate than that from the primary search providers and that duplicate search results from primary search providers should always be used. Since search results from alternate search providers are typically considered to be more accurate than search results from other search providers, the search results from alternate search providers are usually included in the overall search results in their entirety. Duplicate search results from a primary, secondary, and/or failover search providers, if any, are overwritten by the search results from the alternate search provider. In addition, if an alternate search provider does not return a specific result that another search provider does return, the search result from the other search provider should not be included in the overall search results. For example, if the search results from a primary search provider show that a Delta Airlines flight meeting the user request is available and an alternate search provider, for example a direct connection with Delta Airlines, does not provide any flights that meet the user request, then the Delta Airlines flight identified by the primary search provider will not be included in the overall search results. This is done because an alternate search provider is typically more accurate than that from a primary search provider and showed that there was no Delta Airlines flight available. Since at this point search results have been received from a primary, secondary, or failover search provider, final search results will be sent to the user regardless of whether or not any alternate search provider returns any search results.

It should be noted that steps 300-325 above related to the particular system described herein that contains designated primary, secondary, alternate, and failover search providers. If a particular implementation were to contain more or less categorizations of search providers, or not contain any categorization at all, the number of steps for determining if search results were received and merging the search results would be adjusted.

At step 330, all of the search results, whether from a single search provider system or a merging of search results from multiple search provider systems, is formatted and prepared for transmission to the user and this particular process terminates.

At step 335, it has already been determined that no search results have been received from any primary search provider and rules manager 40 determines whether or not a predetermined timeout period has expired. This is done to limit the time a user may have to wait to receive search results or receive a message that no search results could be obtained. In this example, a timeout period between 50 and 90 seconds is used. Alternatively, in some instances a timeout period may not be used, this step would be excluded, and the process would continue with step 340. If the predetermined timeout period has expired, the process continues with step 360, where a search failure message is generated and sent to the user. If the predetermined timeout period has not expired, the process continues with step 340.

At step 340, rules manager 40 determines if there is a failover search provider available. If a failover search provider is not available, the process continues with step 360, where a search failure message is generated and sent to the user. If a failover search provider is available, the process continues with step 345.

At step 345, the search request is sent to the failover search provider and the process continues with step 350.

At step 350, rules manager 40 determines if any search results were received from the failover search provider. If no search results were received from the failover search provider, for example an error or failure message is received or no search results are available with the search constraints, the process continues with step 360, where a search failure message is generated and sent to the user. If search results were received from the failover search provider, the search results from the failover search provider are included in the overall search results and the process continues with step 310 above.

Although the present invention has been shown and described with respect to one example thereof, it should be understood by those skilled in the art that the foregoing and various other changes, omissions, and additions in the form and detail thereof may be made therein without departing from the spirit and scope of the present invention.

What is claimed is:

1. A method for performing data searches in response to a user request, comprising the steps of:
   receiving the user request at an application server;
   using a schedule manager, executed on the application server, to identify a set of search provider systems that provide airline flights between an origin and a destination identified in the user request;
   using a rules manager, executed on the application server, to identify at least one primary search provider system and a failover search provider system from the set of search provider systems identified by the schedule manager, based on the user request;
   sending a search request from the application server to the at least one primary search provider system;
   sending a search request from the application server to the failover search provider system if no search results are received from the at least one primary search provider system;
   receiving search results from at least one of the search provider systems;
   using the rules manager to merge the search results received; and
   sending the merged search results from the application server to a user.

2. The method of claim 1, wherein the search providers comprise searchable data relating to airline flights.

3. The method of claim 1, further comprising the step of using the rules manager, executed on the application server, to identify a secondary search provider system from the set of search provider systems identified by the schedule manager, the secondary search provider system containing data not available through the at least one primary search provider system.

4. The method of claim 3, wherein merging the search results comprises merging search results received from the at least one primary search provider system with search results received from the secondary search provider system.

5. The method of claim 3, wherein merging the search results comprises merging the search results received from the failover search provider system with the search results received from the secondary search provider system.

6. The method of claim 1, further comprising the step of using the rules manager, executed on the application server, to identify an alternate search provider system from the set of search provider systems identified by the schedule manager, the alternate search provider system containing data that is more accurate and up to date than the data available through the primary search provider system.

7. The method of claim 6, wherein merging the search results comprises merging search results received from the at least one primary search provider system with search results received from the alternate search provider system.

8. The method of claim 7, wherein the search results received from the at least one primary search provider system that are duplicated in the search results received from the alternate search provider system are overwritten by the search results received from the alternate search provider system.

9. The method of claim 6, wherein merging the search results comprises merging the search results received from the failover search provider system with the search results received from the alternate search provider system.

10. The method of claim 9, wherein the search results received from the failover search provider system that are duplicated in the search results received from the alternate search provider system are overwritten by the search results received from the alternate search provider system.

11. The method of claim 1, further comprising the steps of:
determining if search results were received from the at least one primary search provider system;
determining if search results were received from the failover search provider system; and
if search results are not received from the primary search provider system or from the failover search provider system, sending a search failure message.

* * * * *